United States Patent
Hope et al.

(10) Patent No.: US 8,554,173 B2
(45) Date of Patent: Oct. 8, 2013

(54) POSITION LOCATING DEVICE AND POSITION DETERMINING SYSTEM

(75) Inventors: Nigel Hope, Herfordshire (GB); Reece Pitts, Cambridshire (GB); Robert Clements, London (GB)

(73) Assignee: Paradigm Services Limited, London (GB)

( * ) Notice: Subject to any disclaimer, the term of this patent is extended or adjusted under 35 U.S.C. 154(b) by 0 days.

(21) Appl. No.: 13/245,036

(22) Filed: Sep. 26, 2011

(65) Prior Publication Data

US 2012/0157035 A1   Jun. 21, 2012

Related U.S. Application Data

(63) Continuation of application No. 13/016,034, filed on Jan. 28, 2011, now abandoned, which is a continuation of application No. 12/447,851, filed as application No. PCT/EP2007/009015 on Oct. 18, 2007, now abandoned.

(30) Foreign Application Priority Data

Oct. 30, 2006   (EP) ..................................... 06123152

(51) Int. Cl.
*H04M 11/04*   (2006.01)
(52) U.S. Cl.
USPC .................. 455/404.2; 455/456.1; 455/456.5; 455/456.6; 455/13.4
(58) Field of Classification Search
USPC ...... 455/404.2, 404.1, 456.1, 558, 12.1–13.2, 455/414.1–414.1, 407, 410, 411, 412.1, 412.2, 455/440, 456.3, 456.4, 456.6, 457–460; 342/357.1,352, 357.4, 357.74, 357.59, 457; 340/988, 539.13, 573.1, 8.8
See application file for complete search history.

(56) References Cited

U.S. PATENT DOCUMENTS

| | | | |
|---|---|---|---|
| 5,491,486 A | | 2/1996 | Welles, II et al. |
| 6,075,458 A | * | 6/2000 | Ladner et al. ............... 340/539.1 |
| 6,477,363 B1 | | 11/2002 | Ayoub et al. |
| 7,991,380 B2 | | 8/2011 | Collins et al. |
| 2002/0070881 A1 | | 6/2002 | Marcarelli et al. |
| 2004/0145520 A1 | * | 7/2004 | Richardson et al. ...... 342/357.07 |
| 2005/0014482 A1 | * | 1/2005 | Holland et al. ............ 455/404.1 |
| 2006/0163349 A1 | * | 7/2006 | Neugebauer .................. 235/383 |

FOREIGN PATENT DOCUMENTS

EP   0809117 A2   11/1997

OTHER PUBLICATIONS

European Search Report dated Apr. 20, 2007.
International Search Report dated Mar. 18, 2008.
Written Opinion of the International Searching Authority dated Mar. 18, 2008.

* cited by examiner

*Primary Examiner* — Chuong A Ngo
(74) *Attorney, Agent, or Firm* — Crowell & moring LLP

(57) ABSTRACT

A position locating device comprises a position determining unit for periodically determining the position of the device and storing position data in a memory. On activation of the device, a position transmitting unit periodically transmits a terminal identifier and position data, to a base station via a satellite. A power management unit controls the periodicity of the transmission by the position transmitting means. A position determining system includes the position determining device and a base station for receiving the terminal identifier and position data and relaying the information to a first responder.

16 Claims, 4 Drawing Sheets

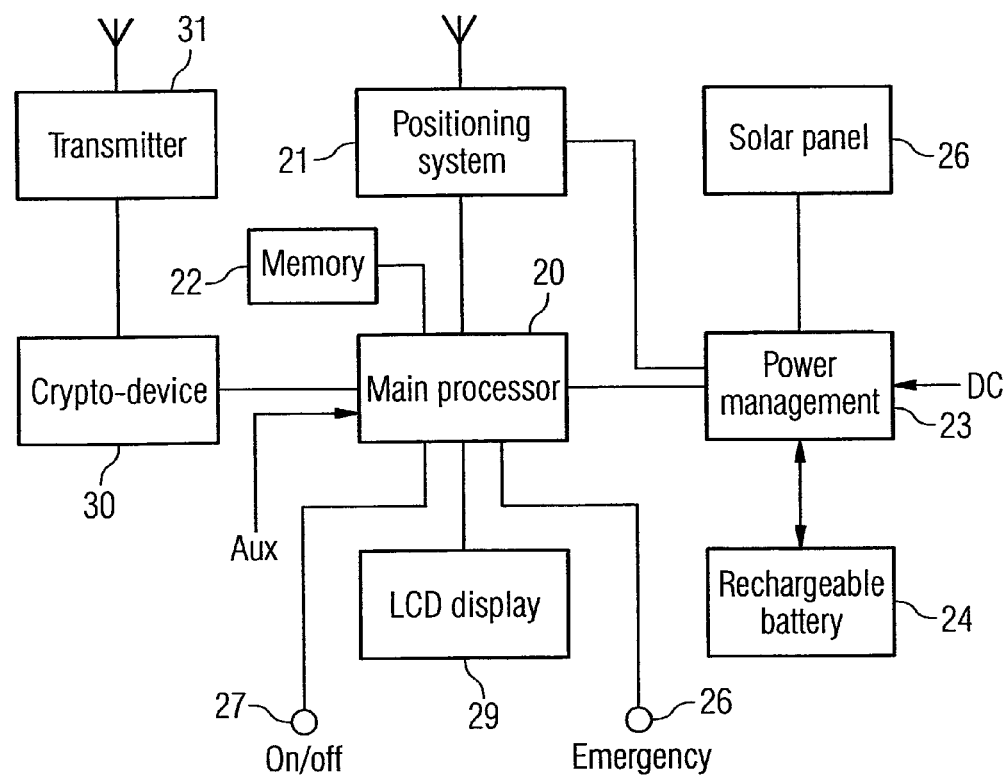

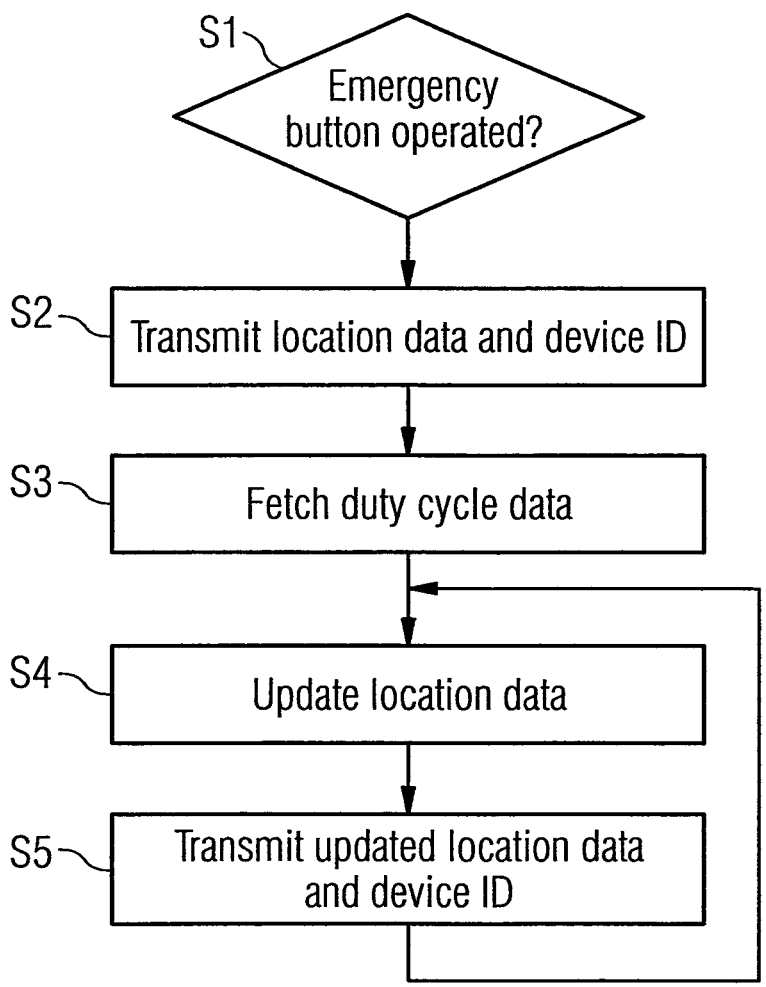

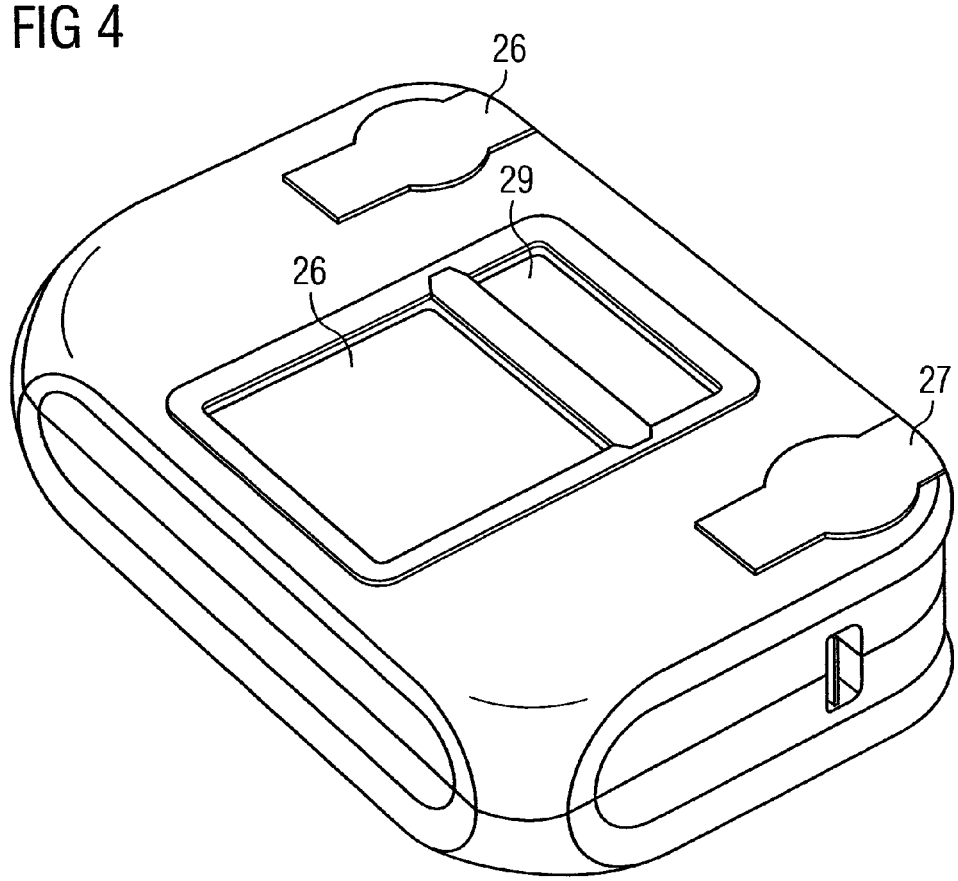

POSITION LOCATING DEVICE AND POSITION DETERMINING SYSTEM

This application is a continuation of U.S. application Ser. No. 13/016,034, filed Jan. 28, 2011, the entire disclosure of which is expressly incorporated herein by reference, which is a continuation of U.S. application Ser. No. 12/447,851, filed Apr. 29, 2009, which is the national stage of International Application No. PCT/EP2007/009015, filed Oct. 18, 2007, which in turn claims priority under 35 U.S.C. §119 to European Patent Application No. 06123152.8, filed Oct. 30, 2006, the priority of which is also claimed in the present application.

BACKGROUND AND SUMMARY OF THE INVENTION

1. Field of the Invention

The present invention relates to a position locating device for determining and transmitting its own position, and a position determining system comprising the position locating device and a base station for receiving transmissions from the position locating device.

2. Background to the Invention

There are a number of situations in which a device which can transmit its position to a base station may be useful. Particularly, such a device would be invaluable in a case of an emergency where it may be necessary to deploy search and rescue units to assist a person in distress or in need of assistance.

Such situations may involve remote locations where a standard mobile telephone network has no coverage, and other forms of radio communication lack sufficient range to any nearby assistance. Examples include skiers or mountain climbers on a mountain, drivers in remote regions such as deserts or yachtsmen at sea, or a crashed airplane. Furthermore, in such situations, even if a person were able to obtain voice communication with a rescue unit via radio or telephone, they might be incapable of describing their location, as they may be incapacitated or separated from instruments which can determine their location. This may be the case if skiers or mountain climbers have been caught in an avalanche or a boat has been capsized in a storm. Furthermore, drivers in remote regions, such as aid workers or oil workers may be in a kidnap situation.

A device which can be activated to automatically determine and transmit its position would be useful in such situations, but would also be useful to any drivers, in the case of, for instance, a breakdown in a remote location late at night.

SUMMARY OF THE INVENTION

The present invention provides a position locating device comprising: position determining apparatus which periodically determines the position of the device and stores position data in a memory; a position transmitter which periodically transmits a terminal identifier and position data to a satellite, upon activation; and power management apparatus which sets the periodicity of the transmission by the position transmitting means.

The transmission of the terminal identifier and position data allows a receiving party to identify the particular device which is transmitting the signal, and to locate its position. The periodic transmission allows a receiving party to follow the device if it is moving. However, each such transmission of data depletes the power source of the device. Therefore, the invention allows the periodicity of the transmission to be set to a level which is appropriate for the circumstances of the use of the device. In some circumstances of use, it is likely that a first responder such as a rescue unit may take a long time to reach the position locating device, such as if the device is used in a very remote location. In such circumstances, it is important that the battery power be conserved, and therefore a longer period between transmissions may be set. In other circumstances, there is a high likelihood that the device will be moving, such as on a yacht, and therefore shorter periods between transmission may be more appropriate to enable accurate tracking of the device.

Preferably, on activation, the position transmitter immediately retrieves the most recently stored position data from the memory and transmits it, together with the terminal identifier, as an initial transmission. Therefore, even if, for instance, the position determining apparatus determines a position of the device every thirty minutes, and the device is activated twenty-eight minutes from the last position determination, the device immediately transmits the last position to the satellite. Thus, a receiving party can be notified immediately that a user of the device is in distress and initiate a response, even if the initial position data may not be the most accurate up-to-date position. The first responder, when notified, will shortly obtain a more accurate position when the next transmission of position data takes place.

The position determining apparatus may change the frequency of the position determination after the device is activated. In particular, the position determining apparatus may increase the frequency of position determination after activation of the device.

Preferably, the position determining apparatus comprises a GPS receiver, which receives position and timing information from GPS satellites and stores the GPS data in a memory. Other forms of position determining means may be used, however. In particular, other satellite navigation systems such as Galileo may be used.

Preferably, the position transmitter transmits the terminal identifier and position data to an IRIDIUM® satellite. The latter are low earth orbiting satellites which relay the data to its destination, such as a base station.

Preferably, the position locating device comprises a rechargeable power source, as well as a solar cell configured to recharge it.

Preferably, the device further comprises an encryption unit for encrypting the terminal identifier and position data before transmission. Preferably the encryption unit encrypts the data according to the Advanced Encryption Standard.

Preferably, the device further comprising apparatus for receiving a position request from a satellite and, in response to receipt of the position request, transmitting the terminal identifier and position data. Thus, the base station can send a request for position information to the device at any time after activation of the device, to obtain its current position.

Preferably, the position locating device includes apparatus for receiving a setting command from a base station via a satellite, wherein the power management apparatus sets the periodicity of the transmission based on the setting command. Thus, the periodicity of the transmission can be set remotely by a receiving party. For instance, if a receiving party determines that the position locating device is in an area which is very remote and a rescue unit or response unit may take a long time to reach the position locating device, then the receiving party can adjust the periodicity of the transmission to provide a longer period between transmission and thus conserve battery power. Alternatively, if a receiving party realizes that a rescue unit can reach the position locating device quickly and particularly if it notes that the position locating device is moving, then the frequency of transmissions can be increased to provide more detailed monitoring of the position.

Preferably, the position locating device comprises apparatus for receiving from a satellite a message and a display for displaying the message. Therefore, the position locating device can receive messages from a receiving party. For instance, the receiving party may send a message indicating when a rescue can be expected. Alternatively, if a receiving party determines that the position locating device is in a region inconvenient for rescue, such as an area where a helicopter cannot land, it can send a message to the position locating device directing the user to a nearby region where rescue is more convenient. Similarly, a receiving party can direct the user to a nearby settlement where medical assistance may be available or a nearby water source.

Preferably, the device includes apparatus for monitoring the output of a power source, wherein the periodicity of the transmission is set dependent on the output of the power source. Preferably, if the power source output is low, a time interval between transmissions is increased. Thus the device can automatically conserve battery power by reducing the number of transmissions.

Preferably, the device comprises apparatus for comparing position data determined at intervals, wherein the periodicity of the transmission is set dependent on a change in the position data, and if the device is determined to be moving by comparison of the position data, the time interval between transmissions is decreased. Thus, the device can automatically conserve battery power by reducing transmissions if the device is stationary and hence less position data is required to track the device. The present invention further provides a position determining system comprising a position determining device as set out above and a base station comprising position receiving apparatus for receiving the terminal identifier and position data from a satellite; and contact apparatus for contacting a first responder identifying the position determining device and its position.

Preferably, the contact apparatus contacts the first responder by telephone or email.

Preferably, the contact apparatus includes storage apparatus storing contact details of a plurality of responders and, if no response is received from the first responder, the contact means contacts a second responder. If the second responder does not respond, then the contact means can contact a third responder, and so on.

Preferably, the base station comprises a decryption unit for decrypting the received terminal identifier and position data.

Preferably, the base station comprises apparatus for transmitting a setting command to the position locating device via a satellite, wherein the power management apparatus sets the periodicity of the transmission based on the setting command.

Preferably, the base station comprises apparatus for transmitting a position request to the position locating device via a satellite, and in response to receipt of the position request, the position transmitting means transmits the terminal identifier and position data.

Other objects, advantages and novel features of the present invention will become apparent from the following detailed description of the invention when considered in conjunction with the accompanying drawings.

BRIEF DESCRIPTION OF THE DRAWINGS

Preferred embodiments of the present invention will now be described with reference to the accompanying drawings, in which:

FIG. 2 illustrates schematically the components of a position locating device in accordance with the present invention;

FIG. 3 is a flow diagram illustrating a method of operation of the position location device; and FIG. 4 is a perspective view of the device of FIG. 2.

DETAILED DESCRIPTION

Figure 1:
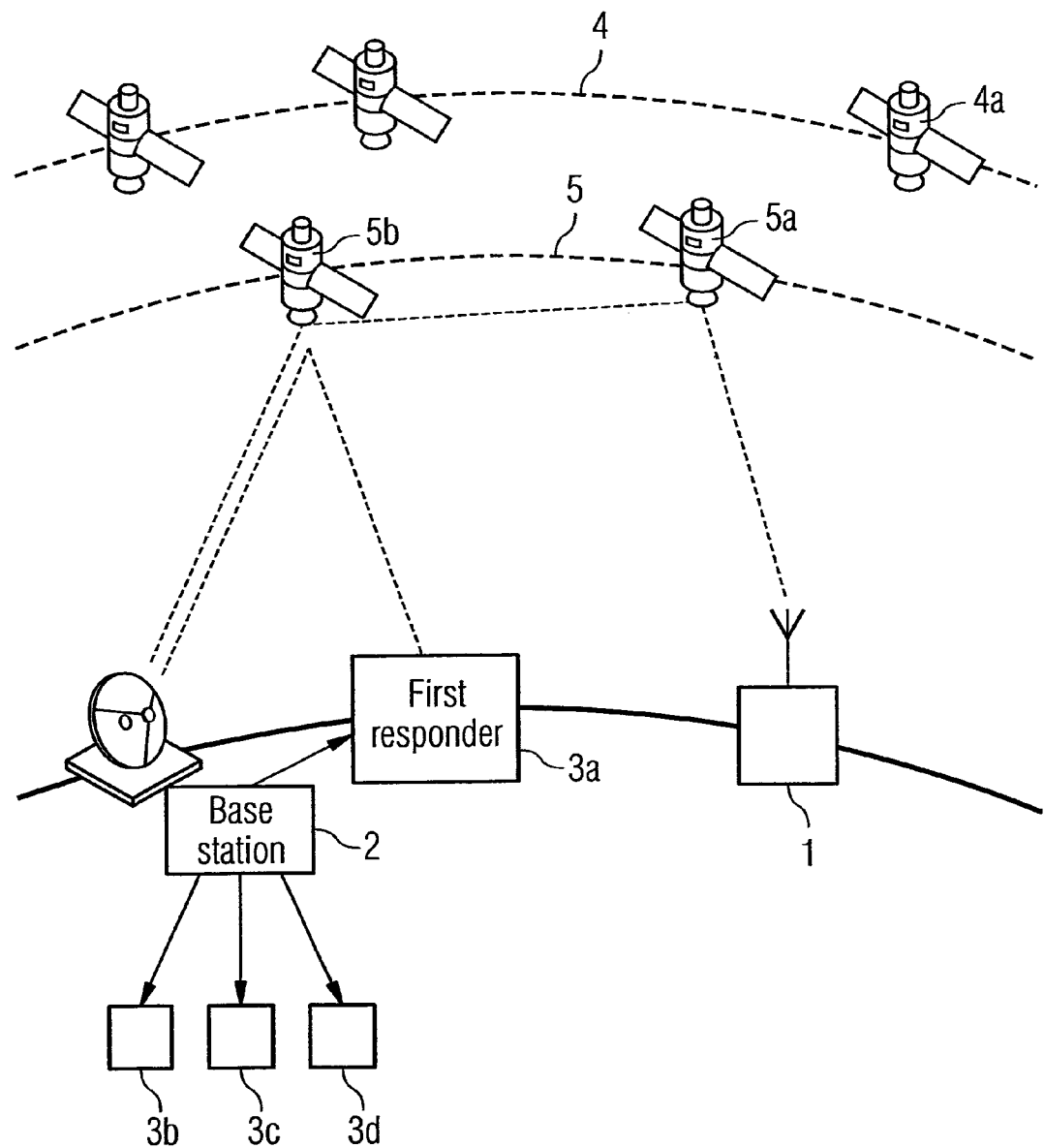
FIG. 1 illustrates a position determining system including a position locating device in accordance with the present invention.

FIG. 1 illustrates a position determining system comprising a position determining device 1 which may be carried by a user or placed in a vehicle such as a car, boat or airplane, and a base station 2 for receiving transmissions from the position locating device 1 and for contacting a first responder 3a and/or a plurality of further responders 3b, 3c, 3d.

The position locating device 1 is in communication with two satellite systems. The first is the GPS satellite system 4 for providing position information, and the second comprises the IRIDIUM® satellite system 5, for relaying communications between the position locating device 1 and the base station 2. The position locating device 1 periodically receives position information from a GPS satellite 4a and, on activation, periodically transmits position data together with a terminal identifier, which identifies the particular device to an IRIDIUM® satellite 5a.

The transmitted data also include a destination identifier which allows the satellite 5a to forward the data by relaying it, either directly or via one or more other satellite 5b in the IRIDIUM® system 5, to the base station 2. The base station 2 can contact the first and subsequent responders 3a-3d by a number of means of communication. The base station 2 may contact the first responder 3a by means of the IRIDIUM® satellite system 5, or by telephone or email or radio communication. The base station includes stored contact details for the responders 3a-3d, and sends a message first to the first responder 3a, including information identifying the position locating device 1 which has been activated and its position determined from the received position data. If the base station 2 receives no response from the first responder 3a, then it contacts the second responder 3b. If no response is received from the second responder 3b, then the base station 2 retrieves details of, and contacts, a third responder 3c, and so on. Once one of the responders responds, the base station 2 opens communication with that entity and forwards future received position data to that entity.

FIGS. 2 and 4 illustrate in more detail the components of the position locating device 1, which is hand held and may, for example, be placed on the dashboard of a vehicle. The position locating device 1 comprises a main processor 20, and a position determining unit in the form of a GPS receiver 21 which periodically receives position data from the GPS satellite 4a. The position data are stored in a memory 22.

The device 1 is powered by a power source comprising a rechargeable battery 24, and further comprises a power management unit 23. The rechargeable battery 24 can be recharged via the power management unit 23 from either a DC input 25 or a solar panel 26 mounted on the exterior of the position locating device 1. The exterior of the device 1 includes an on/off button 27, and an emergency activation button 28 and an LCD display 29. Both the on/off button 27 and the emergency activation button 28 may be covered by flip-up covers to prevent accidental activation.

The position locating device 1 further includes an encrypting unit 30 and a position transmitting unit 31.

FIG. 3 is a flow diagram illustrating the operation sequence of the device when the emergency activation button 28 is operated.

On operation of the emergency activation button 28 at step Si, the main processor 20 immediately recalls the most recently stored position data from the memory 22. The position data comprises a 120 character string. The main processor 20 adds a 20 character terminal identifier to form a 140 character string, and a destination identifier which identifies where the transmission is to be sent. This information is forwarded to the encryption unit 30, which encrypts on the terminal identifier and the position data in accordance with the well known Advanced Encryption Standard (AES). The encrypted data and the destination identifier are then transmitted at step S2 by the position transmitting means 31 to the IRIDIUM® satellite system 5.

The main processor 20 recalls duty cycle data at step S3 from the power management means 23. The duty cycle data can be set in accordance with the circumstances in which the position determining device 1 is to be used. The duty cycle data are used by the main controller 20 to determine the periodicity (time interval) at which position data are transmitted by the position transmitting means 31 to the base station 2 via the IRIDIUM® satellite system 5.

The main processor 20 then controls the GPS receiver 21 to periodically update the position data stored in memory 22 (step S4), periodically retrieve position data from the memory 22, and forward it to the encrypting unit 30 for transmission by the position transmitting unit 31 (step S5).

The base station 2 may also send messages or commands to the position determining device 1 via the IRIDIUM® satellite system 5 once the position determining device 1 has been activated by pressing of the emergency button 28. In particular, the base station 2 may send a position request at any time after activation of the position determining device 1. When the position determining device 1 receives the position request, it immediately responds by transmitting the most recently stored position data and its terminal identifier to the base station 2 via the IRIDIUM® satellite system 5.

The base station 2 may also send a setting command which includes duty cycle data, commanding the position determining device to reset the duty cycle to a specified time interval for transmissions. Thus if, for some reason, a receiving party decides that more or less frequent position data is required, they can control the duty cycle of the position determining device 1 accordingly.

The base station 2 may also send messages to the position locating device 1, which may be displayed on a display such as an LCD display. Therefore, the position locating device 1 can receive messages from the receiving party. For instance, the receiving party may send a message indicating when a rescue can be expected. Alternatively, if a receiving party determines that the position locating device 1 is in a region inconvenient for rescue, such as an area where a helicopter cannot land, it can send a message to the position locating device 1 directing the user to a nearby region where rescue is more convenient. Similarly, a receiving party can direct the user to a nearby settlement where medical assistance may be available or a nearby water source.

The main processor 20 may also be programmed to control the duty cycle by monitoring the position data or the power output of the battery 24. If the power output of the battery is low, the time interval between transmissions may be increased. Thus the device 1 can automatically conserve battery power by reducing the number of transmissions. Also, the main processor can be programmed to compare position data determined at time intervals, and the periodicity of the transmission can be set dependent on a change in the position data. In particular, if the device 1 is determined to be moving by comparison of the position data, then in order to track the device 1 accurately, more frequent position data are required and therefore the time interval between transmissions is decreased. On the other hand, if the device is determined to be stationary, it is not necessary for a receiving party to receive such frequent position updates, and so the time interval between transmissions can be increased. Thus, the device can automatically conserve battery power by reducing transmissions if the device is stationary and hence less position data is required to track the device.

Both of the base station 2 and the position determining device 1 may be programmed with anti-spam and anti-spoof software to preclude unauthorized access.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A position determining system comprising:
a position locating device including a position determining unit which periodically determines the position of the device and stores position data in a memory, a position transmitting unit which, upon activation, periodically transmits a terminal identifier and position data to a satellite, and a power management unit which controls periodicity of the transmission by the position transmitting unit; and
a base station that operates to conserve battery power remotely from said position locating device by adjustment of said periodicity, and that includes contact means for contacting a first responder and, when no response is received from the first responder, contacting at least one other responder.

2. The system according to claim 1, wherein, on activation, the position transmitting unit retrieves the most recently stored position data from the memory, and transmits it, together with the terminal identifier.

3. The system according to claim 1, wherein the position determining unit comprises a GPS receiver.

4. The system according to claim 1, wherein the position transmitting unit transmits the terminal identifier and position data to a communications satellite.

5. The system according to claim 1, further comprising a rechargeable power source.

6. The system according to claim 5, further comprising a solar cell configured to recharge the power source.

7. The system according to claim 1, further comprising an encrypting unit for encrypting the terminal identifier and position data before transmission.

8. The system according to claim 7, wherein the encryption unit encrypts the data according to the Advanced Encryption Standard.

9. The system according to claim 1, further comprising means for receiving a position request from a satellite and, in response to receipt of the position request, transmitting the terminal identifier and position data.

10. The system according to claim 1, wherein the position locating device further comprises means for receiving a setting command from a satellite, wherein the periodicity is adjusted based on the setting command.

11. The system according to claim 1, further comprising:
means for receiving from a satellite a message; and
display means for displaying the message.

12. The system according to claim 1, further comprising means for monitoring the output of a power source.

13. The system according to claim 12, wherein, when the power source output is low, a time interval between transmissions is increased.

14. The system according to claim 1, further comprising means for comparing position data determined at intervals, wherein the periodicity of the transmission is set dependent on a change in the position data.

15. The system according to claim 14, wherein, when the device is determined to be moving by comparison of the position data, a time interval between transmissions is decreased.

16. The system according to claim 1, wherein the base station further includes position receiving means for receiving the terminal identifier and position data from a satellite.

* * * * *